(12) United States Patent
Scrivens et al.

(10) Patent No.: US 8,795,561 B2
(45) Date of Patent: *Aug. 5, 2014

(54) PROCESS OF FORMING A NANOFIBER NON-WOVEN CONTAINING PARTICLES

(75) Inventors: Walter A. Scrivens, Moore, SC (US); Hao Zhou, Boiling Springs, SC (US)

(73) Assignee: Milliken & Company, Spartanburg, SC (US)

( * ) Notice: Subject to any disclaimer, the term of this patent is extended or adjusted under 35 U.S.C. 154(b) by 629 days.

This patent is subject to a terminal disclaimer.

(21) Appl. No.: 12/893,041

(22) Filed: Sep. 29, 2010

(65) Prior Publication Data

US 2012/0074612 A1    Mar. 29, 2012

(51) Int. Cl.
| | |
|---|---|
| *D01F 1/02* | (2006.01) |
| *D04H 1/413* | (2012.01) |
| *D04H 3/005* | (2012.01) |
| *D01D 5/08* | (2006.01) |
| *D04H 1/541* | (2012.01) |
| *D04H 1/544* | (2012.01) |
| *D04H 1/549* | (2012.01) |
| *D04H 1/55* | (2012.01) |
| *B29C 47/00* | (2006.01) |

(52) U.S. Cl.
CPC ............. *D04H 1/413* (2013.01); *D04H 3/005* (2013.01); *D01D 5/082* (2013.01); *B29C 47/0004* (2013.01); *B29C 47/0014* (2013.01); *D04H 1/541* (2013.01); *D04H 1/544* (2013.01); *D04H 1/549* (2013.01); *D04H 1/55* (2013.01)
USPC ... 264/103; 264/210.1; 264/211; 264/211.16; 264/211.19

(58) Field of Classification Search
USPC ............. 264/103, 210.1, 211, 211.16, 211.19
See application file for complete search history.

(56) References Cited

U.S. PATENT DOCUMENTS

| | | | |
|---|---|---|---|
| 3,953,566 A | 4/1976 | Gore | 264/288 |
| 3,956,020 A | 5/1976 | Weininger et al. | 136/146 |
| 3,973,068 A | 8/1976 | Weber | 428/198 |
| 4,008,344 A | 2/1977 | Okamoto et al. | 427/307 |
| 4,197,148 A | 4/1980 | Shinomura | 156/79 |

(Continued)

FOREIGN PATENT DOCUMENTS

| | | |
|---|---|---|
| EP | 1 983 286 | 8/2008 |
| WO | WO 2007/132943 | 11/2007 |

(Continued)

OTHER PUBLICATIONS

Patent Cooperation Treaty PCT International Search Report. Date of Mailing, Oct. 24, 2011. International Application No. PCT/US2011/041432. International filing date, Jun. 22, 2011.

*Primary Examiner* — Leo B Tentoni
(74) *Attorney, Agent, or Firm* — Cheryl J. Brickey

(57) ABSTRACT

A process for forming a nanofiber non-woven includes mixing a first and second thermoplastic polymer and a plurality of particles, then subjecting the mixture to elongational forces when the first and second polymers are in a softened condition forming nanofibers of the first polymer. Next, the mixture is brought to a condition where the temperature is below the softening temperature of the first polymer forming a first intermediate. The first intermediate is consolidated forming the second intermediate where at least 70% of the nanofibers are fused to other nanofibers. Next, at least a portion of the second polymer is removed and at least 50% of the particles are positioned adjacent a surface of the nanofibers.

20 Claims, 5 Drawing Sheets

(56) References Cited

U.S. PATENT DOCUMENTS

| | | | |
|---|---|---|---|
| 4,203,847 A | 5/1980 | Grandine, 2nd | 210/490 |
| 4,629,563 A | 12/1986 | Wrasidlo | 210/500.34 |
| 4,632,873 A | 12/1986 | Mizuno et al. | 428/364 |
| 4,640,962 A | 2/1987 | Ostrozynski et al. | 525/474 |
| 4,874,567 A | 10/1989 | Lopatin et al. | 264/45.1 |
| 5,051,183 A | 9/1991 | Takita et al. | 210/500.36 |
| 5,069,970 A | 12/1991 | Largman et al. | 428/373 |
| 5,093,197 A | 3/1992 | Howard et al. | 428/372 |
| 5,114,631 A | 5/1992 | Nyssen et al. | 264/6 |
| 5,126,219 A | 6/1992 | Howard et al. | 429/252 |
| 5,158,721 A | 10/1992 | Allegrezza, Jr. et al. | 264/22 |
| 5,208,098 A | 5/1993 | Stover | 428/284 |
| 5,230,843 A | 7/1993 | Howard et al. | 264/41 |
| 5,230,949 A | 7/1993 | Howard et al. | 428/224 |
| 5,238,618 A | 8/1993 | Kinzer | 264/41 |
| 5,260,003 A | 11/1993 | Nyssen et al. | 264/6 |
| 5,476,589 A | 12/1995 | Bacino | 210/500.36 |
| 5,522,991 A | 6/1996 | Tuccelli et al. | 210/490 |
| 5,814,405 A | 9/1998 | Branca et al. | 428/311.51 |
| 5,840,234 A | 11/1998 | Ito et al. | 264/205 |
| 5,885,456 A | 3/1999 | Charkoudian et al. | 210/500.41 |
| 6,368,742 B2 | 4/2002 | Fisher et al. | 429/145 |
| 6,399,188 B1 | 6/2002 | Smith et al. | 428/313.5 |
| 6,520,425 B1 | 2/2003 | Reneker | 239/294 |
| 6,777,496 B2 | 8/2004 | Patel et al. | 525/177 |
| 6,824,716 B2 | 11/2004 | Liao et al. | 264/49 |
| 6,890,872 B2 | 5/2005 | Bond et al. | 442/414 |
| 6,994,811 B2 | 2/2006 | Kools | 264/41 |
| 7,356,229 B2 | 4/2008 | Ouderkirk et al. | 385/115 |
| 7,356,231 B2 | 4/2008 | Ouderkirk et al. | 385/123 |
| 7,390,760 B1 | 6/2008 | Chen et al. | 442/341 |
| 7,406,239 B2 | 7/2008 | Ouderkirk et al. | 385/131 |
| 7,537,807 B2 | 5/2009 | Craighead et al. | 427/458 |
| 7,599,592 B2 | 10/2009 | Benson, Jr. et al. | 385/122 |
| 2002/0012793 A1 | 1/2002 | Tajima et al. | 428/364 |
| 2002/0073667 A1 | 6/2002 | Barris et al. | 55/486 |
| 2003/0106294 A1 | 6/2003 | Chung et al. | 55/486 |
| 2003/0195611 A1 | 10/2003 | Greenhalgh et al. | 623/1.15 |
| 2003/0217928 A1 | 11/2003 | Lin et al. | 205/109 |
| 2004/0060268 A1 | 4/2004 | Chung et al. | 55/482 |
| 2004/0060269 A1 | 4/2004 | Chung et al. | 55/482 |
| 2004/0096652 A1 | 5/2004 | Royer et al. | 428/364 |
| 2004/0123572 A1 | 7/2004 | Chung et al. | 55/482 |
| 2004/0187454 A1 | 9/2004 | Chung et al. | 55/482 |
| 2004/0241482 A1 | 12/2004 | Grah et al. | 428/518 |
| 2005/0112349 A1 | 5/2005 | Laurencin et al. | 428/292.1 |
| 2005/0131139 A1 | 6/2005 | Kaner et al. | 524/800 |
| 2005/0258562 A1 | 11/2005 | Wilson et al. | 264/130 |
| 2006/0019819 A1 | 1/2006 | Shao-Horn et al. | 502/4 |
| 2006/0047052 A1 | 3/2006 | Barrera et al. | 524/495 |
| 2006/0065021 A1 | 3/2006 | Khatri et al. | 65/393 |
| 2006/0117730 A1 | 6/2006 | Chung et al. | 55/524 |
| 2006/0154063 A1 | 7/2006 | Fujihara et al. | 428/373 |
| 2006/0237694 A1 | 10/2006 | Kaner et al. | 252/500 |
| 2007/0012007 A1 | 1/2007 | Chung et al. | 55/528 |
| 2007/0207186 A1* | 9/2007 | Scanlon et al. | 424/424 |
| 2007/0259177 A1 | 11/2007 | Gupta et al. | 428/367 |
| 2008/0014410 A1 | 1/2008 | Johnston et al. | 428/141 |
| 2008/0149561 A1 | 6/2008 | Chu et al. | 210/500.38 |
| 2008/0160856 A1* | 7/2008 | Chen et al. | 442/341 |
| 2008/0208358 A1 | 8/2008 | Bellamkonda et al. | 623/23.72 |
| 2008/0217807 A1 | 9/2008 | Lee et al. | 264/172.18 |
| 2008/0264259 A1 | 10/2008 | Leung | 96/143 |
| 2008/0311815 A1 | 12/2008 | Gupta et al. | 442/351 |
| 2009/0004460 A1 | 1/2009 | Gruber et al. | 428/323 |
| 2009/0039565 A1 | 2/2009 | Reneker et al. | 264/515 |
| 2009/0042029 A1 | 2/2009 | Havel et al. | 428/372 |
| 2009/0042475 A1* | 2/2009 | Pourdeyhimi | 442/335 |
| 2009/0306775 A1 | 12/2009 | Macossay-Torres | 623/13.2 |
| 2009/0326128 A1 | 12/2009 | Macossay-Torres | 524/413 |
| 2010/0028999 A1 | 2/2010 | Nain | 435/377 |

FOREIGN PATENT DOCUMENTS

| | | |
|---|---|---|
| WO | WO 2008/028134 | 3/2008 |
| WO | WO 2008/041183 | 4/2008 |
| WO | WO 2009/002858 | 12/2008 |

* cited by examiner

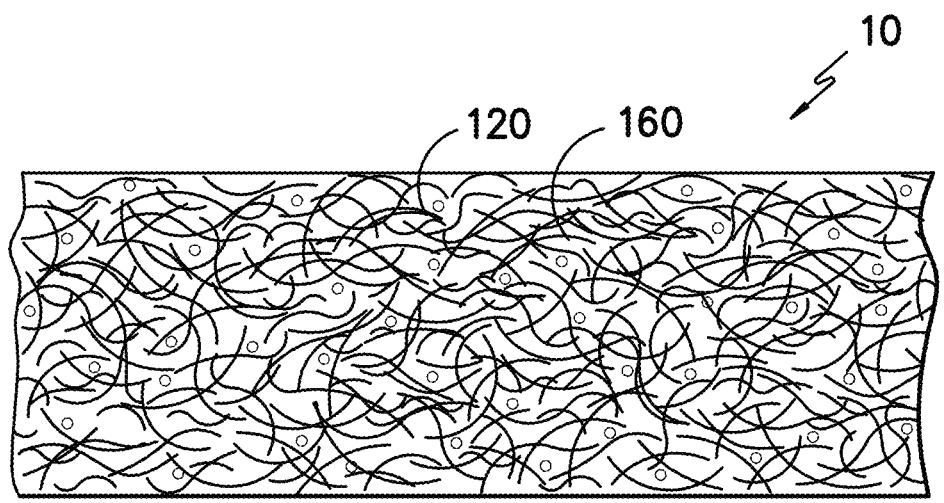
FIG. -1-
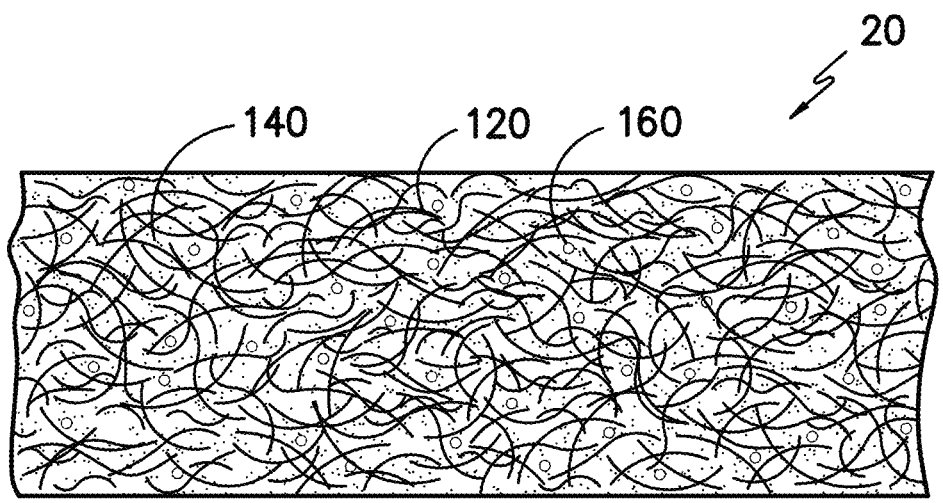
FIG. -2-

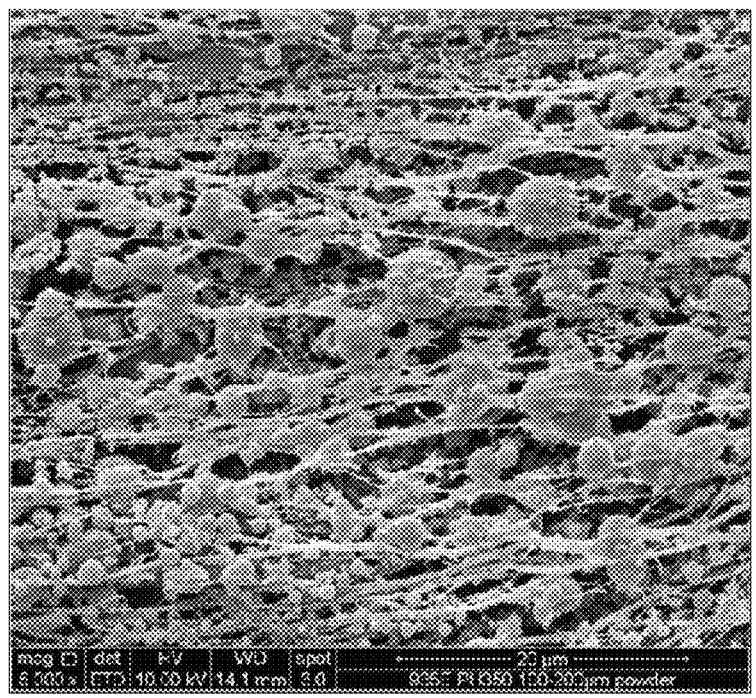
FIG. -3A-
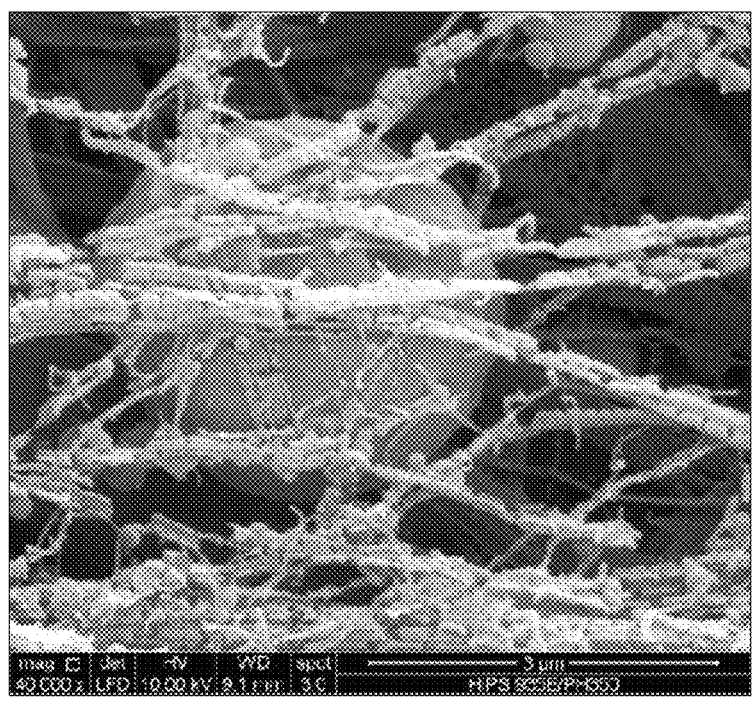
FIG. -3B-

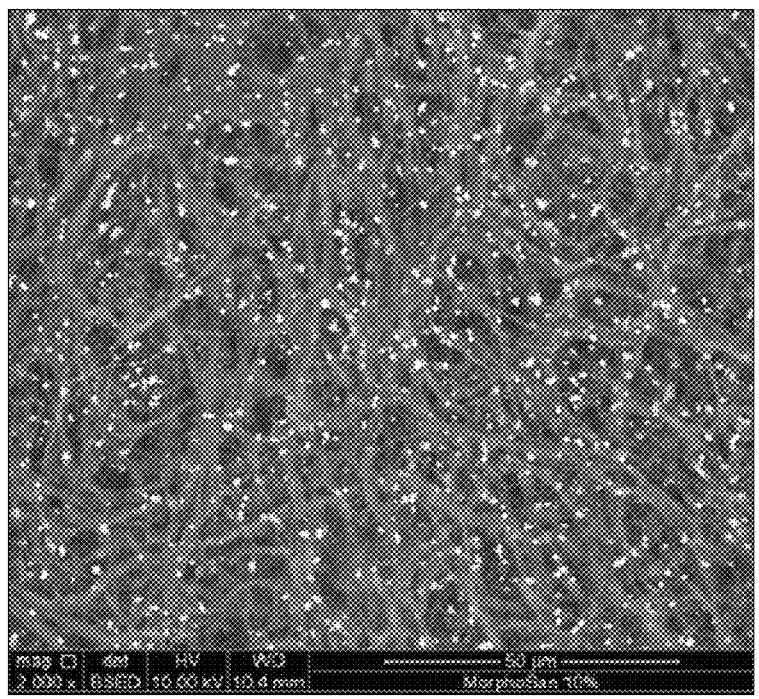
FIG. -4A-
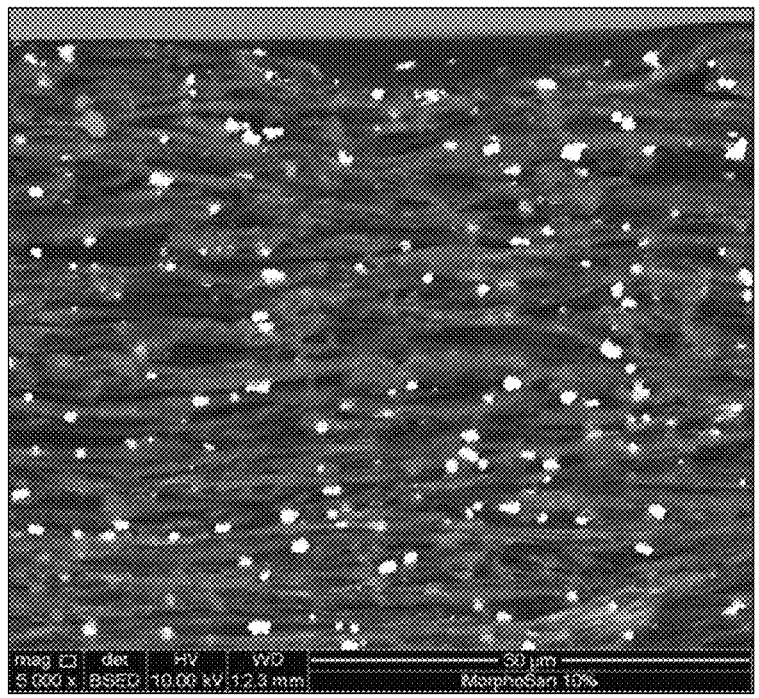
FIG. -4B-

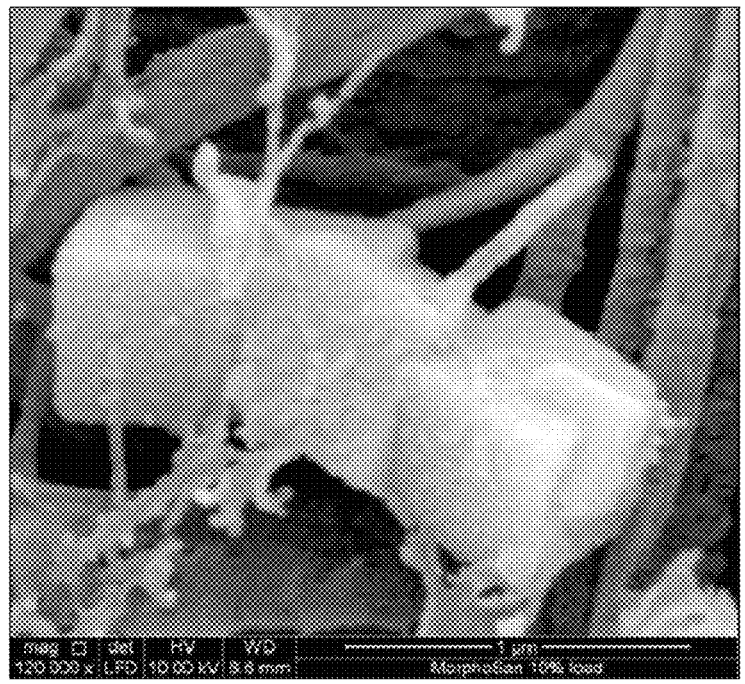
FIG. -4C-
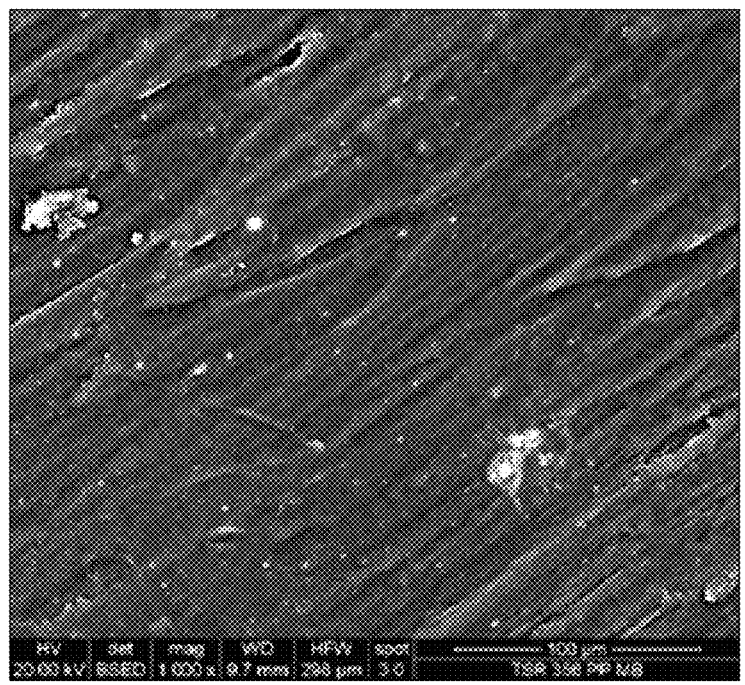
FIG. -4D-

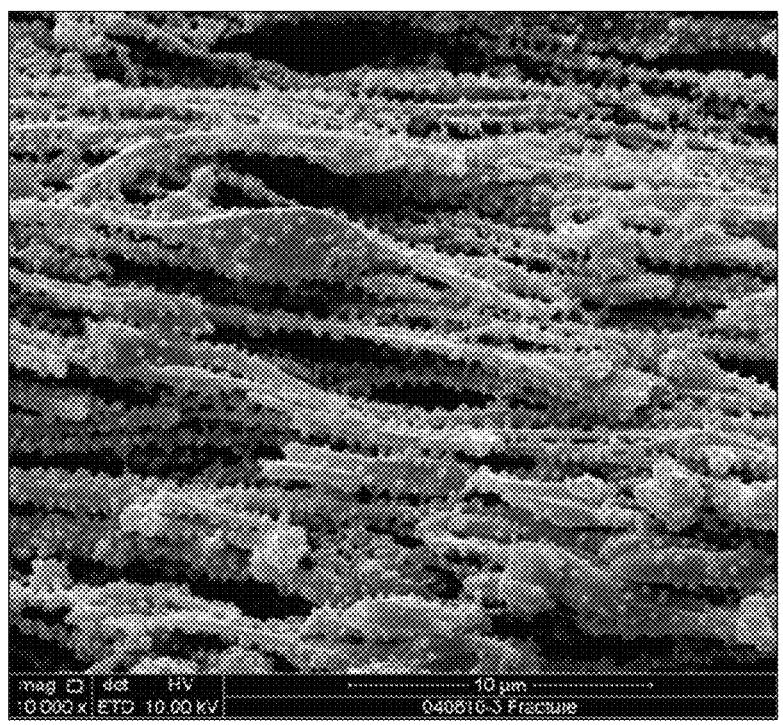
FIG. −5−

PROCESS OF FORMING A NANOFIBER NON-WOVEN CONTAINING PARTICLES

RELATED APPLICATIONS

This application is related to the following applications, each of which is incorporated by reference: U.S. patent application Ser. No. 12/893,021 entitled "Process of Forming Nano-Composite and Nano-Porous Non-Wovens", U.S. patent application Ser. No. 12/893,046 entitled "Core/Shell Nanofiber Non-Woven", U.S. patent application Ser. No. 12/893,010 entitled "Gradient Nanofiber Non-Woven", U.S. patent application Ser. No. 12/893,028 entitled "Nanofiber Non-Wovens Containing Particles", U.S. patent application Ser. No. 12/893,030 entitled "Multi-Layer Nano-Composites", and U.S. patent application Ser. No. 12/893,035 entitled "Nanofiber Non-Woven Composite", each of which being filed on Sep. 29, 2010.

TECHNICAL FIELD

The present application is directed to nanofiber non-wovens and nanofiber nano-composites containing particles and the related processes for making.

BACKGROUND

Both particles (especially nano-particles) and nanofibers have been in the interest of various industries due to the high surface area to volume ratio offered by these materials. By incorporating nano-particles (or other sized particles) in a nanofiber non-woven matrix, one can add additional functionalities that can be useful in many applications such as catalysis, microelectronic, medicine, antimicrobial, sensing, magnetics, electrochemistry, and optics. By designing the appropriate particle size to fiber size, interesting flow or filtration properties can also achieved.

The market applications for nanofibers are rapidly growing and promise to be diverse. Applications include filtration, barrier fabrics, insulation, absorbable pads and wipes, personal care, biomedical and pharmaceutical applications, whiteners (such as $TiO_2$ substitution) or enhanced web opacity, nucleators, reinforcing agents, acoustic substrates, apparel, energy storage, etc. Due to their limited mechanical properties that preclude the use of conventional web handing, loosely interlaced nanofibers are often applied to a supporting substrate such as a non-woven or fabric material. The bonding of the nanofiber cross over points may be able to increase the mechanical strength of the nanofiber non-wovens which potentially help with their mechanical handling and offer superior physical performance. Thus there is a need for a bonded non-woven containing particles.

BRIEF SUMMARY

The present disclosure provides a process for forming a nanofiber non-woven. This includes mixing a first and second thermoplastic polymer and a plurality of particles, then subjecting the mixture to elongational forces when the first and second polymers are in a softened condition forming nanofibers of the first polymer. Next, the mixture is brought to a condition where the temperature is below the softening temperature of the first polymer forming a first intermediate. The first intermediate is consolidated forming the second intermediate where at least 70% of the nanofibers are fused to other nanofibers. Next, at least a portion of the second polymer is removed and at least 50% of the particles are positioned adjacent a surface of the nanofibers.

BRIEF DESCRIPTION OF THE DRAWINGS

FIG. 1 illustrates a cross-section of one embodiment of the nanofiber non-woven.

FIG. 2 illustrates a cross-section of one embodiment of the nanofiber nano-composite.

FIGS. 3A and 3B are SEMs of Example 1.

FIGS. 4A-4D are SEMs of Example 3.

FIG. 5 is an SEM of Example 4.

DETAILED DESCRIPTION

"Nanofiber", in this application, is defined to be a fiber having a diameter less than 1 micron. In certain instances, the diameter of the nanofiber is less than about 900, 800, 700, 600, 500, 400, 300, 200 or 100 nm, preferably from about 10 nm to about 200 nm. In certain instances, the nanofibers have a diameter from less than 100 nm. The nanofibers may have cross-sections with various regular and irregular shapes including, but not limiting to circular, oval, square, rectangular, triangular, diamond, trapezoidal and polygonal. The number of sides of the polygonal cross-section may vary from 3 to about 16.

"Non-woven" means that the layer or article does not have its fibers arranged in a predetermined fashion such as one set of fibers going over and under fibers of another set in an ordered arrangement.

As used herein, the term "thermoplastic" includes a material that is plastic or deformable, melts to a liquid when heated and freezes to a brittle, glassy state when cooled sufficiently. Thermoplastics are typically high molecular weight polymers. Examples of thermoplastic polymers that may be used include polyacetals, polyacrylics, polycarbonates, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polymethylpentene (and co-polymers thereof), polynorbornene (and co-polymers thereof), polyethylene terephthalates, polyvinylidene fluorides, polysiloxanes, or the like, or a combination comprising at least one of the foregoing thermoplastic polymers. In some embodiments, polyolefins include polyethylene, poly($\alpha$-olefin)s. As used herein, poly($\alpha$-olefin) means a polymer made by polymerizing an alpha-olefin. An $\alpha$-olefin is an alkene where the carbon-carbon double bond starts at the $\alpha$-carbon atom. Exemplary poly($\alpha$-olefin)s include polypropylene, poly(l-butene) and polystyrene. Exemplary polyesters include condensation polymers of a $C_{2-12}$ dicarboxylic acid and a $C_{2-12}$ alkylenediol. Exemplary polyamides include condensation polymers of a $C_{2-12}$ dicarboxylic acid and a $C_{2-12}$ alkylenediamine, as well as polycaprolactam (Nylon 6).

FIG. 1 illustrates one embodiment of the nano-fiber non-woven 10 which contains a plurality of thermoplastic nanofibers 120 and a plurality of particles 160. At least 70% of the nanofibers 120 are fused to other nanofibers 120 within the nano-fiber non-woven 10. Preferably, the particles are nanoparticles. At least 50% of the particles 160 are positioned adjacent a surface of the nanofibers 120. This means that the resultant non-woven produced would contain particles stuck, adhered, or otherwise attached to the nanofibers so that they would not simply fall out of the non-woven. In another embodiment, at least 70% of the particles 160 are positioned adjacent a surface of the nanofibers 120, more preferably at least 80%. The particles may be entrapped in the non-woven due to the small size of the holes in the non-woven.

The thermoplastic polymer forming the nanofibers 120 is referred herein as the first polymer. The thermoplastic polymer forming an optional matrix (140 shown in FIG. 2) is referred herein as the second polymer. The matrix (second polymer) and the nanofibers (first polymer) may be formed of any suitable thermoplastic polymer that is melt-processable. The second polymer preferably is able to be removed by a condition to which the first polymer is not susceptible. The most common case is the second polymer is soluble in a solvent in which the first polymer is insoluble. "Soluble" is defined as the state in which the intermolecular interactions between polymer chain segments and solvent molecules are energetically favorable and cause polymer coils to expand. "Insoluble" is defined as the state in which the polymer-polymer self-interactions are preferred and the polymer coils contract. Solubility is affected by temperature.

The solvent may be an organic solvent, water, an aqueous solution or a mixture thereof. Preferably, the solvent is an organic solvent. Examples of solvents include, but are not limited to, acetone, alcohol, chlorinated solvents, tetrahydrofuran, toluene, aromatics, dimethylsulfoxide, amides and mixtures thereof. Exemplary alcohol solvents include, but are not limited to, methanol, ethanol, isopropanol and the like. Exemplary chlorinated solvents include, but are not limited to, methylene chloride, chloroform, tetrachloroethylene, carbontetrachloride, dichloroethane and the like. Exemplary amide solvents include, but are not limited to, dimethylformamide, dimethylacetamide, N-methylpyrollidinone and the like. Exemplary aromatic solvents include, but are not limited to, benzene, toluene, xylene (isomers and mixtures thereof), chlorobenzene and the like. In another embodiment, the second polymer may be removed by another process such as decomposition. For example, polyethylene terephthalate (PET) may be removed with base (such as NaOH) via hydrolysis or transformed into an oligomer by reacting with ethylene glycol or other glycols via glycolysis, or nylon may be removed by treatment with acid. In yet another embodiment, the second polymer may be removed via depolymerization and subsequent evaporation/sublimation of smaller molecular weight materials. For example, polymethyleneoxide, after deprotection, can thermally depolymerize into formaldehyde which subsequently evaporates/sublimes away.

The first and second polymers are thermodynamically immiscible. Common miscibility predictors for non-polar polymers are differences in solubility parameters or Flory-Huggins interaction parameters. For polymers with non-specific interactions, such as polyolefins, the Flory-Huggins interaction parameter may be calculated by multiplying the square of the solubility parameter difference by the factor (V/RT), where V is the molar volume of the amorphous phase of the repeated unit V=M/Δ (molecular weight/density), R is the gas constant, and T is the absolute temperature. As a result, the Flory-Huggins interaction parameter between two non-polar polymers is always a positive number. Thermodynamic considerations require that for complete miscibility of two polymers in the melt, the Flory-Huggins interaction parameter has to be very small (e.g., less than 0.002 to produce a miscible blend starting from 100,000 weight-average molecular weight components at room temperature). It is difficult to find polymer blends with sufficiently low interaction parameters to meet the thermodynamic condition of miscibility over the entire range of compositions. However, industrial experience suggests that some blends with sufficiently low Flory-Huggins interaction parameters, although still not miscible based on thermodynamic considerations, form compatible blends.

Preferably the viscosity and surface energy of the first polymer and the second polymer are close. Theoretically, a 1:1 ratio would be preferred. If the surface energy and/or the viscosity are too dissimilar, nanofibers may not be able to form. In one embodiment, the second polymer has a higher viscosity than the first polymer.

The first polymer and second polymer may be selected from any thermoplastic polymers that meet the conditions stated above, are melt-processable, and are suitable for use in the end product. Suitable polymers for either the first or second polymer include, but are not limited to polyacetals, polyacrylics, polycarbonates, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polymethylpentene (and co-polymers thereof), polynorbornene (and co-polymers thereof), polyethylene terephthalates, polyvinylidene fluorides, polysiloxanes, or the like, or a combination comprising at least one of the foregoing thermoplastic polymers. In some embodiments, polyolefins include polyethylene, cyclic olefin copolymers (e.g. TOPAS®), poly(α-olefin)s. As used herein, poly(α-olefin) means a polymer made by polymerizing an alpha-olefin. An α-olefin is an alkene where the carbon-carbon double bond starts at the α-carbon atom. Exemplary poly(α-olefin)s include polypropylene, poly(1-butene) and polystyrene. Exemplary polyesters include condensation polymers of a $C_{2-12}$ dicarboxylic acid and a $C_{2-12}$ alkylenediol. Exemplary polyamides include condensation polymers of a $C_{2-12}$ dicarboxylic acid and a $C_{2-12}$ alkylenediamine. Additionally, the first and/or second polymers may be copolymers and blends of polyolefins, styrene copolymers and terpolymers, ionomers, ethyl vinyl acetate, polyvinylbutyrate, polyvinyl chloride, metallocene polyolefins, poly(alpha olefins), ethylene-propylene-diene terpolymers, fluorocarbon elastomers, other fluorine-containing polymers, polyester polymers and copolymers, polyamide polymers and copolymers, polyurethanes, polycarbonates, polyketones, and polyureas, as well as polycaprolactam (Nylon 6).

In one embodiment, some preferred polymers are those that exhibit an alpha transition temperature (Tα) and include, for example: high density polyethylene, linear low density polyethylene, ethylene alpha-olefin copolymers, polypropylene, poly(vinylidene fluoride), poly(vinyl fluoride), poly(ethylene chlorotrifluoroethylene), polyoxymethylene, poly(ethylene oxide), ethyl ene-vinyl alcohol copolymer, and blends thereof. Blends of one or more compatible polymers may also be used in practice of the invention. Particularly preferred polymers are polyolefins such as polypropylene and polyethylene that are readily available at low cost and may provide highly desirable properties in the microfibrous articles used in the present invention, such properties including high modulus and high tensile strength.

Useful polyamide polymers include, but are not limited to, synthetic linear polyamides, e.g., nylon-6, nylon-6,6, nylon-11, or nylon-12. Polyurethane polymers which may be used include aliphatic, cycloaliphatic, aromatic, and polycyclic polyurethanes. Also useful are polyacrylates and polymethacrylates, which include, for example, polymers of acrylic acid, methyl acrylate, ethyl acrylate, acrylamide, methylacrylic acid, methyl methacrylate, n-butyl acrylate, and ethyl acrylate, to name a few. Other useful substantially extrudable hydrocarbon polymers include polyesters, polycarbonates, polyketones, and polyureas. Useful fluorine-containing polymers include crystalline or partially crystalline polymers such as copolymers of tetrafluoroethylene with one or more other monomers such as perfluoro(methyl vinyl) ether, hexafluoropropylene, perfluoro(propyl vinyl)ether; copolymers of tetrafluoroethylene with ethylenically unsaturated hydrocarbon monomers such as ethylene, or propylene.

Representative examples of polyolefins useful in this invention are polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene. Representative blends of polyolefins useful in this invention are blends containing polyethylene and polypropylene, low-density polyethylene and high-density polyethylene, and polyethylene and olefin copolymers containing the copolymerizable monomers, some of which are described above, e.g., ethylene and acrylic acid copolymers; ethyl and methyl acrylate copolymers; ethylene and ethyl acrylate copolymers; ethylene and vinyl acetate copolymers-, ethylene, acrylic acid, and ethyl acrylate copolymers, and ethylene, acrylic acid, and vinyl acetate copolymers.

The thermoplastic polymers may include blends of homo- and copolymers, as well as blends of two or more homo- or copolymers. Miscibility and compatibility of polymers are determined by both thermodynamic and kinetic considerations. A listing of suitable polymers may also be found in PCT published application WO2008/028134, which is incorporated in its entirety by reference.

The thermoplastic polymers may be used in the form of powders, pellets, granules, or any other melt-processible form. The particular thermoplastic polymer selected for use will depend upon the application or desired properties of the finished product. The thermoplastic polymer may be combined with conventional additives such as light stabilizers, fillers, staple fibers, anti-blocking agents and pigments. The two polymers are blended while both are in the molten state, meaning that the conditions are such (temperature, pressure) that the temperature is above the melting temperature (or softening temperature) of both of the polymers to ensure good mixing. This is typically done in an extruder. The polymers may be run through the extruder more than once to ensure good mixing.

In one embodiment, the first polymer content of the first polymer/second polymer mixture is about 5% to about 90% by volume, preferably from 10% to about 70% vol, more preferably from 15% to about 60% vol, even more preferably from about 17% to about 50% vol. In another embodiment, the first and second polymers have a volume ratio from about 100:1 to about 1:100, preferably, from about 40:1 to 1:40, more preferably from about 30:1 to about 1:30, even more preferably, from 20:1 to about 1:20; still even more preferably from 10:1 to 1:10; preferably from 3:2 to about 2:3. (4:1, 1:4) Preferably, the second polymer is the major phase comprising more than 50% by volume of the mixture.

Some preferred matrix (second polymer), nanofiber (first polymer), solvent combinations include, but are not limited to:

| Matrix (second polymer) | Nanofiber (first polymer) | Solvent (for matrix) |
|---|---|---|
| Polymethyl methacrylate (PMMA) | Polypropylene (PP) | Toluene |
| Cyclic olefin Copolymer | PP | Toluene |
| Cyclic Olefin copolymer | Thermoplastic Elastomer (TPE) | Toluene |
| Cyclic Olefin Copolymer | Polyethylene (PE) | Toluene |
| Cyclic Olefin Copolymer | Polymethylpentene | Toluene |
| Polystyrene (PS) | Linear Low density polyethylene (LLDPE) | Toluene |
| Nylon 6 | PP | Formic Acid |
| Nylon 6 | PE | Formic Acid |
| PS | Polyethylene terephthalate (PET) | Toluene |
| PET | PP | decomposition through hydrolysis |
| TPU (Thermoplastic Polyurethane) | PP | Dimethyl formamide (DMF) |
| TPU | PE | DMF |
| TPU | Nylon | DMF |
| poly(vinyl alcohol) (PVA) | PP | Water |
| Cyclic olefin | TPU | Toluene |
| PS | TPU | Toluene |
| Polycarbonate (PC) | Nylon | Toluene |
| PC | PP | Toluene |
| Polyvinyl chloride (PVC) | PP | Chloroform |
| Noryl (Polyphenyleneoxide PPO and PS blend) | PP | Toluene |
| Noryl | Nylon 6 | Chloroform |
| Polyacrylonitrilebutadiene-styrene (ABS) | Nylon 6 | Hexane |
| ABS | PP | Chloroform |
| PVC | Nylon | Benzene |
| Polybutyleneterephthalate (PBT) | PE | trifluoroacetic acid |

In one embodiment, the second polymer is polystyrene and the first polymer could be linear low density polyethylene (LLDPE), high density polyethylene (HDPE), isotactic polypropylene (iPP), polyethylene terephthalate (PET), polytrimethylene terephthalate (PTT), polybutylene terephthalate (PBT), poly(butylene adipate terephthalate) (PBAT), poly(Ethylene terephthalate-co-isophthalate)-poly(ethylene glycol) (IPET-PEG), and a highly modified cationic ion-dyeable polyester (HCDP).

In one embodiment, the matrix is a water vapor permeable material such as PEBAX resin, a block copolymer of nylon a polyether, by Arkema or a water vapor permeable thermoplastic polyurethane (TPU). The nanofibers in the layer reinforce the layer and also serve as a moisture barrier. When this layer is laminated on a fabric via extrusion coating or calendaring, a breathable water proof fabric composite is created without the matrix material (second polymer) having to be removed.

The particles 160 of FIG. 1 may be any suitable particle, including nano-particles, micron-sized particles or larger. "Nano-particle" is defined in this application to be any particle with at least one dimension less than one micron. The particles may be, but are not limited to, spherical, cubic, cylindrical, platelet, and irregular. Preferably, the nano-particles used have at least one dimension less than 800 nm, more preferably less than 500 nm, more preferably, less than 200 nm, more preferably less than 100 nm. The particles may be organic or inorganic.

Examples of suitable organic particles include buckminsterfullerenes (fullerenes), dendrimers, organic polymeric nanospheres, aminoacids, and linear or branched or hyperbranched "star" polymers such as 4, 6, or 8 armed polyethylene oxide with a variety of end groups, polystyrene, superabsorbing polymers, silicones, crosslinked rubbers, phenolics, melamine formaldehyde, urea formaldehyde, chitosan or other biomolecules, and organic pigments (including metalized dyes).

Examples of suitable inorganic particles include, but are not limited to, calcium carbonate, calcium phosphate (e.g., hydroxy-apatite), talc, mica, clays, metal oxides, metal hydroxides, metal sulfates, metal phosphates, silica, zirconia, titania, ceria, alumina, iron oxide, vanadia, antimony oxide, tin oxide, alumina/silica, zirconium oxide, gold, silver, cadmium selenium, chalcogenides, zeolites, nanotubes, quantum dots, salts such as $CaCO_3$, magnetic particles, metal-organic frameworks, and any combinations thereof.

In one embodiment, the particles are further functionalized. Via further chemistry, the third surface of the particles may have added functionality (reactivity, catalytically functional, electrical or thermal conductivity, chemical selectivity, light absorbtion) or modified surface energy for certain applications.

In another embodiment, particles are organic-inorganic, coated, uncoated, or core-shell structure. In one embodiment, the particles are PEG (polyethylene glycol) coated silica, PEG coated iron oxide, PEG coated gold, PEG coated quantum dots, hyperbranched polymer coated nano-clays, or other polymer coated inorganic particles such as pigments. The particles, in one embodiment, may melt and re-cool in the process of forming the nanofiber non-woven. The particles may also be an inorganic core—inorganic shell, such as Au coated magnetic particles. The particles, in one embodiment, may melt and re-cool in the process of forming the nanofiber non-woven. In another embodiment, the particles are ZELEC®, made by Milliken and Co. which has a shell of antimony tin oxide over a core that may be hollow or solid, mica, silica or titania. A wax or other extractable coating (such as functionalized copolymers) may cover the particles to aid in their dispersion in the matrix polymer.

In one embodiment, the nanofibers are core/shell nanofibers. The cores and shells may have any suitable thickness ratio depending on the end product. The core (formed from the first polymer) of the nanofiber extends the length of the nanofiber and forms the center of the nanofiber. The shell of the fiber at least partially surrounds the core of the nanofiber, more preferably surrounds approximately the entire outer surface of the core. Preferably, the shell covers both the length of the core as well as the smaller ends of the core. The shell polymer may be any suitable polymer, preferably selected from the listing of polymers for the first polymer and the second polymer.

At least a portion of the core polymer interpenetrates the shell of the nanofiber and at least a portion of the shell polymer interpenetrates the core of the nanofiber. This occurs as the core and shell polymers are heated and formed together. The polymer chains from the core polymers interpenetrate the shell and the polymer chains from the shell polymer interpenetrate the core and the core and shell polymers intermingle. This would not typically occur from a simple coating of already formed nanofibers with a coating polymer.

In one embodiment, the matrix polymer is polystyrene and the core polymer could be linear low density polyethylene (LLDPE), high density polyethylene (HDPE), isotactic polypropylene (iPP), polyethylene terephthalate (PET), polytrimethylene terephthalate (PTT), polybutylene terephthalate (PBT), poly(butylene adipate terephthalate) (PBAT), poly (Ethylene terephthalate-co-isophthalate)-poly(ethylene glycol) (IPET-PEG), and a highly modified cationic ion-dyeable polyester (HCDP).

The core and shell polymers may be chosen with to have a different index of refraction or birefringence for desired optical properties. In another embodiment, the core polymer is soluble in a second solvent (which may be the same solvent or different solvent as the first solvent), such that the core of the core/shell nanofibers may be removed leaving bonded hollow nanofibers.

In another embodiment, a third polymer may be added. This third component is a thermoplastic that may be form additional nanofibers or additional matrix. The third polymer may be soluble or insoluble in the solvent that the second polymer is soluble in, depending on the desired end product. In one embodiment, the first and third polymers are insoluble in a solvent that the second polymer is soluble in. The amounts of polymers are selected such that the first and third polymers form nanofibers in a matrix of the second polymer. This second polymer may be partially or fully removed by the solvent. In another embodiment, the first polymer is insoluble in a solvent that the second polymer and the third polymer are soluble in. The amounts of polymers are selected such that the first polymer forms nanofibers in a matrix of the second polymer and the third polymer. The second and third polymers may be partially or fully removed by the solvent. In another embodiment, the second polymer is soluble in a first solvent, the third polymer is soluble in a second solvent, and the first polymer is insoluble in the first and second solvents. The amounts of polymers are selected such that the first polymer forms nanofibers in a matrix of the second polymer and the third polymer. This second and third polymer may be selectively removed by the first and/or second solvent.

In another embodiment, a third component, reactive or non-reactive, such as a compatiblizer, a blooming agent, or a co-polymer may be add in the system so at least part of it migrates to the interface between the first and second polymer in the first intermediate. Such a third component may be selected to be partially soluble or insoluble in the second solvent. This third component will be exposed on the surface of the first polymer after etching. Via further chemistry, the third component surface of the first polymer may have added functionality (reactivity, catalytically functional, conductivity, chemical selectivity) or modified surface energy for certain applications. For example, in a PS/PP system (second polymer/first polymer), PP-g-MAH (maleated PP) or PP-g-PS, styrene/ethylene-butylene/styrene (SEBS) may be added to the system. The added MAH and the styrene functional groups may be further reacted to add functionality to the nano-composite or nanofiber non-woven.

In another embodiment, the third component may be any suitable material the blooms or moves to the surface of the first polymer when subjected to heat and extensional forces. In some embodiments, the third component may be a polymer, co-polymer, a large molecule, or a small molecule. Typically, the third component has a smaller molecular weight than the bulk polymer. In one embodiment, the third component has one-tenth the molecular weight of the bulk polymer. In another embodiment, the third component has one-thousandth the molecular weight of the bulk polymer. In another embodiment, the third component has one-millionth the molecular weight of the bulk polymer. As a general rule, the greater the difference between the molecular weights of the bulk polymer and third component, the greater the amount of bloom (which results in more of the third component at the surface of the nanofiber). In one embodiment, the third component is a lubricant. The third component being a lubricant would help control the release properties of the nanofibers and non-woven. The third component being a lubricant also allows the nanofibers to more easily move across each other during consolidation giving better randomization. A lubricant could also alter the mechanical properties of the final non-woven structure.

In another embodiment, the nanofiber non-woven contains at least one textile layer which may be any suitable textile layer. The textile layer may be on one or both sides of the nanofiber non-woven, or between some layers of the nanofiber non-woven. If more than one textile layer is used, they may each contain the same or different materials and constructions. In one embodiment, the textile layer is selected from the group consisting of a knit, woven, non-woven, and unidirectional layer. The textile layer provides turbulence of the molten mixture of the first and second polymer during extrusion and/or subsequent consolidation causing nanofiber movement, randomization, and bonding. The textile layer may be formed from any suitable fibers and/or yarns including natural and man-made. Woven textiles can include, but are not limited to, satin, twill, basket-weave, poplin, and crepe weave textiles. Jacquard woven textiles may be useful for creating more complex electrical patterns. Knit textiles can include, but are not limited to, circular knit, reverse plaited circular knit, double knit, single jersey knit, two-end fleece knit, three-end fleece knit, terry knit or double loop knit, warp knit, and warp knit with or without a micro denier face. The textile may be flat or may exhibit a pile. The textile layer may have any suitable coating upon one or both sides, just on the surfaces or through the bulk of the textile. The coating may impart, for example, soil release, soil repel/release, hydrophobicity, and hydrophilicity.

As used herein yarn shall mean a continuous strand of textile fibers, spun or twisted textile fibers, textile filaments, or material in a form suitable for knitting, weaving, or otherwise intertwining to form a textile. The term yarn includes, but is not limited to, yarns of monofilament fiber, multifilament fiber, staple fibers, or a combination thereof. The textile material may be any natural or man-made fibers including but not limited to man-made fibers such as polyethylene, polypropylene, polyesters (polyethylene terephthalate, polybutylene terephthalate, polytrimethylene terephthalate, polylactic acid, and the like, including copolymers thereof), nylons (including nylon 6 and nylon 6,6), regenerated cellulosics (such as rayon), elastomeric materials such as Lycra™, high-performance fibers such as the polyaramids, polyimides, PEI, PBO, PBI, PEEK, liquid-crystalline, thermosetting polymers such as melamine-formaldehyde (BASOFIL™) or phenol-formaldehyde (KYNOL™), basalt, glass, ceramic, cotton, coir, bast fibers, proteinaceous materials such as silk, wool, other animal hairs such as angora, alpaca, or vicuna, and blends thereof.

In another embodiment, the nanofiber non-woven or nano-composite further comprises a support layer on at least one side. The nanofiber non-woven or nano-composite and supporting layer may formed together, preferably through co-extrusion or attached together at a later processing step. If the supporting layer is co-extruded, then the supporting layer contains the supporting polymer which may be any suitable thermoplastic that is co-extrudable which the choice of first polymer and second polymer. The supporting polymer may be selected from the listing of possible thermoplastic polymers listed for the first polymer and the second polymer. In one embodiment, the supporting polymer is the same polymer as the second polymer or is soluble in the same solvent as the second polymer. This allows the matrix (second polymer) and the supporting layer (which is a sacrificial layer) to be removed at the same time leaving just the nanofibers in the nanofiber non-woven layer. In another embodiment, the supporting polymer is a different polymer than the second polymer and is not soluble in the same solvents as the second polymer. This produces a nanofiber non-woven or nano-composite on the supporting layer after removing the second polymer which is advantageous for applications that require a non-woven having increased dimensional stability and strength. The supporting layer decreases the edge effects of extruding or otherwise forming the nanofiber non-woven layer so that the size and density of the nanofibers is more even across the thickness (from the first side to the second side) of the nanofiber non-woven or nano-composite.

The process of forming the nanofiber non-woven (FIG. 1) and the nanofiber nano-composite (FIG. 2) begins with blending a first polymer and a second polymer in a molten state along with particles. The first polymer forms discontinuous regions in the second polymer. These discontinuous regions may be nano-, micro-, or larger sized liquid drops dispersed in the second polymer. This mixture is optionally cooled before the next step.

Next, the polymer blend is subjected to extensional flow and shear stress with heating such that the first polymer forms nanofibers. The nanofibers formed have an aspect ratio of at least 5:1 (length to diameter), more preferably, at least 10:1, at least 50:1, at least 100:1, and at least 1000:1. The nanofibers are generally aligned along an axis, referred to herein as the "nanofiber axis". Preferably, at least 80% of the nanofibers are aligned within 20 degrees of this axis. After the extensional flow less than 30% by volume of the nanofibers are bonded to other nanofibers. This means that at least 70% of the nanofibers are not bond (adhered or otherwise) to any other nanofiber. Should the matrix (second polymer) by removed at this point, the result would be mostly separate individual nanofibers. In another embodiment, after step 200, less than 20%, less than 10%, or less than 5% of the nanofibers are bonded to other nanofibers. At least 50% of the particles are positioned adjacent a surface of the nanofibers. This means that the resultant non-woven produced would contain particles stuck, adhered, or otherwise attached to the nanofibers so that they would not simply fall out of the non-woven.

In one embodiment, the mixing of the first and second polymers and the extension flow may be performed by the same extruder, mixing in the barrel of the extruder, then extruded through the die or orifice. The extensional flow and shear stress may be from, for example, extrusion through a slit die, a blown film extruder, a round die, injection molder, or a fiber extruder. These materials may then be subsequently drawn further in either the molten or softened state.

The molten polymer blend is then cooled to a temperature below the softening temperature of the first polymer to preserve the nanofiber shape. "Softening temperature" is defined to be the temperature where the polymers start to flow. For crystalline polymers, the softening temperature is the melting temperature. For amorphous polymers, the softening temperature is the Vicat temperature. This cooled molten polymer blend forms the first intermediate.

Next, the first intermediate is formed into a pre-consolidation formation in step 400. Forming the first intermediate into a pre-consolidation formation involves arranging the first intermediate into a form ready for consolidation. The pre-consolidation formation may be, but is not limited to, a single film, a stack of multiple films, a fabric layer (woven, non-woven, knit, unidirectional), a stack of fabric layers, a layer of powder, a layer of polymer pellets, an injection molded article, or a mixture of any of the previously mentioned. The polymers in the pre-consolidation formation may be the same through the layers and materials or vary.

In a first embodiment, the pre-consolidation formation is in the form of a fabric layer. In this embodiment, the molten polymer blend is extruded into fibers which form the first intermediate. The fibers of the first intermediate are formed into a woven, non-woven, knit, or unidirectional layer. This fabric layer may be stacked with other first intermediate layers such as additional fabric layers or other films or powders. In a second embodiment, the pre-consolidation formation is in the form of a film layer. In this embodiment, the molten polymer blend is extruded into a film which forms the first intermediate. The film may be stacked with other films or other first intermediate layers. The film may be consolidated separately or layered with other films. In one embodiment, the films are stacked such that the nanofiber axes all align. In another embodiment, shown in FIG. 5, the films 210 are cross-lapped such that the nanofiber axis of one film is perpendicular to the nanofiber axes of the adjacent films forming the pre-consolidation formation 410. If two or more films are used, they may each contain the same or different polymers. For example, a PP/PS 80%/20% wt film may be stacked with a PP/PS 75%/25% wt film. Additionally, a PE/PS film may be stacked on a PP/PS film. Other angles for cross-lapping may also be employed.

In a third embodiment, the pre-consolidation formation is in the form of a structure of pellets, which may be a flat layer of pellets or a three-dimensional structure. In this embodiment, the molten polymer blend is extruded into a fiber, film, tube, elongated cylinder or any other shape and then is pelletized which forms the first intermediate. Pelletizing means that the larger cooled polymer blend is chopped into finer components. The most common pelletizing method is to extrude a pencil diameter fiber, then chop the cooled fiber into pea-sized pellets. The pellets may be covered or layered with any other first intermediate structures such as fabric layers or film layers.

In a fourth embodiment, the pre-consolidation formation is in the form of a structure of a powder, which may shaped into be a flat layer of powder or a three-dimensional structure. In this embodiment, the molten polymer blend is extruded, cooled, and then ground into a powder which forms the first intermediate. The powder may be covered or layered with any other first intermediate structures such as fabric layers or film layers.

In a fifth embodiment, the pre-consolidation formation is in the form of a structure of an injection molded article. The injection molded first intermediate may be covered or layered with any other first intermediate structures such as fabric layers or film layers.

Additionally, the pre-consolidation formation may be layered with other layers (not additional first intermediates) such as fabric layers or other films not having nanofibers or embedded into additional layers or matrixes. One such example would be to embed first intermediate pellets into an additional polymer matrix. The pre-consolidation layer may also be oriented by stretching in at least one axis.

Consolidation is conducted at a temperature is above the $T_g$ and of both the first polymer and second polymer and within 50 degrees Celsius of the softening temperature of first polymer. More preferably, consolidation is conducted at 20 degrees Celsius of the softening temperature of the first polymer. The consolidation temperature upper limit is affected by the pressure of consolidation and the residence time of consolidation. For example, a higher consolidation temperature may be used if the pressure used is high and the residence time is short. If the consolidation is conducted at a too high a temperature, too high a pressure and/or too long a residence time, the fibers might melt into larger structures or revert back into discontinuous or continuous spheres.

Consolidating the pre-consolidation formation causes nanofiber movement, randomization, and at least 70% by volume of the nanofibers to fuse to other nanofibers. This forms the second intermediate. This movement, randomization, and bonding of the nanofibers may be accomplished two ways. On being that the pre-consolidation formation contains multiple nanofiber axes. This may arise, for example, from stacking cross-lapped first intermediate layers or using a non-woven, or powder. When heat and pressure is applied during consolidation, the nanofibers move relative to one another and bond where they interact. Another method of randomizing and forming the bonds between the nanofibers is to use a consolidation surface that is not flat and uniform. For example, if a textured surface or fabric were used, even if the pressure was applied uniformly, the flow of the matrix and the nanofibers would be turbulent around the texture of the fabric yarns or the textured surface causing randomization and contact between the nanofibers. If one were to simply consolidate a single layer of film (having most of the nanofibers aligned along a single nanofiber axis) using a press that delivered pressure perpendicular to the plane of the film, the nanofibers would not substantially randomize or bond and once the matrix was removed, predominately individual (unattached) nanofibers would remain.

In pre-consolidation formations such as powders or pellets the nanofiber axes are randomized and therefore a straight lamination or press would produce off-axis pressure. The temperature, pressure, and time of consolidation would move the nanofibers between the first intermediates causing randomization and bonding of the nanofibers. Preferably, at least 75% vol of the nanofibers to bond to other nanofibers, more preferably at least 85% vol, more preferably at least 90% vol, more preferably at least 95% vol, more preferably at least 98% vol. Consolidation forms the second intermediate, also referred to as the nanofiber nano-composite (20 shown in FIG. 2).

At applied pressure and temperature, the second polymer is allowed to flow and compress resulting in bringing "off-axis" nanofibers to meet at the cross over points and fuse together. Additional mixing flow of the second polymer may also be used to enhance the mixing and randomization of the off-axis fibers. One conceivable means is using a textured non-melting substrate such as a fabric (e.g. a non-woven), textured film, or textured calendar roll in consolidation. Upon the application of pressure, the local topology of the textured surface caused the second polymer melt to undergo irregular fluctuations or mixing which causes the direction of the major axis of the nanofibers to alter in plane, resulting in off-axis consolidations. In a straight lamination or press process, due to the high melt viscosity and flow velocity, the flow of the second polymer melt is not a turbulent flow and cross planar flow is unlikely to happen. When the majority of the nanofibers are in parallel in the same plane, the nanofibers will still be isolated from each other, resulting in disintegration upon etching.

The second intermediate (also called nanofiber nano-composite) shown in FIG. 2 contains the nanofibers 120 formed from the first polymer, where at least 70% vol of the nanofibers are bonded to other nanofibers in a matrix 140 of the second polymer and the nanofibers 160. This nanofiber nano-composite may be used, for example, in reinforcement structures, or a portion or the entire second polymer may be removed.

Next, an optional step of dissolving at least a portion of the second polymer from the nanofiber nano-composite is conducted. A small percentage (less than 30% vol) may be removed, most, or all of the second polymer may be removed. If just a portion of the second polymer is removed, it may be removed from the outer surface of the intermediate leaving the nano-composite having a nanofiber non-woven surrounding the center of the article which would remain a nano-composite. The removal may be across one or more surfaces of the second intermediate or may be done pattern-wise on the second intermediate. Additionally, the second polymer may be removed such that there is a concentration gradient of the second polymer in the final product with the concentration of the second polymer the lowest at the surfaces of the final product and the highest in the center. The concentration gradient may also be one sided, with a concentration of the second polymer higher at one side.

If essentially the entire or the entire second polymer is removed from the second intermediate, what remains is a nanofiber non-woven shown in FIG. 1, where at least 70% vol of the nanofibers are bonded to other nanofibers. The bonding between the nanofibers 120 provides physical integrity for handling of the etched films/non-woven in the etching process which makes the use of a supporting layer optional. Smearing and/or tearing of the nanofibers upon touching is commonly seen in the poorly consolidated second intermediates. The second polymer may be removed using a suitable solvent or decomposition method described above.

The benefit of the process of consolidating the pre-consolidation layer is the ability to form the bonds between the nanofibers without losing the nanofiber structure. If one were to try to bond the nanofibers in a nanofiber non-woven, when heat is applied, the nanofibers would all melt together and the nanofibers would be lost. This would occur when the heat is uniform, such as a lamination or nip roller, or is specific such as spot welding or ultrasonics.

In one embodiment, the nanofiber non-woven 10 (or nanofiber nano-composite 20) may contain additional microfibers and/or engineering fibers. Engineering fibers are characterized by their high tensile modulus and/or tensile strength. Engineering fibers include, but are not limited to, E-glass, S-glass, boron, ceramic, carbon, graphite, aramid, poly (benzoxazole), ultra high molecular weight polyethylene (UHMWPE), and liquid crystalline thermotropic fibers. The use of these additional fibers in the composites and non-wovens/films may impart properties that may not be realized with a single fiber type. For example, the high stiffness imparted by an engineering fiber may be combined with the low density and toughness imparted by the nanofibers. The extremely large amount of interfacial area of the nanofibers may be effectively utilized as a means to absorb and dissipate energy, such as that arising from impact. In one embodiment a nanofibers mat comprised of hydrophobic nanofibers is placed at each of the outermost major surfaces of a mat structure, thereby forming a moisture barrier for the inner layers. This is especially advantageous when the inner layers are comprised of relatively hydrophilic fibers such as glass.

In one embodiment, the bonded nanofibers may improve the properties of existing polymer composites and films by providing nanofiber-reinforced polymer composites and films, and corresponding fabrication processes, that have a reduced coefficient of thermal expansion, increased elastic modulus, improved dimensional stability, and reduced variability of properties due to either process variations or thermal history. Additionally, the increased stiffness of the material due to the nanofibers may be able to meet given stiffness or strength requirements.

The bonded nanofibers of the nanofiber non-woven may be used in many known applications employing nanofibers including, but not limited to, filter applications, catalysis, adsorbtion and separation applications, computer hard drive applications, biosensor applications and pharmaceutical applications. The nanofibers are useful in a variety of biological applications, including cell culture, tissue culture, and tissue engineering applications. In one application, a nanofibrillar structure for cell culture and tissue engineering may be fabricated using the nanofibers of the present invention.

EXAMPLES

Various embodiments are shown by way of the Examples below, but the scope of the invention is not limited by the specific Examples provided herein.

Example 1

The matrix (second polymer) and particles used in Example 1 were high impact polystyrene (HIPS) which was obtained in pellet form from Total Petrochemicals as HIPS 935E and had a melt flow of 3.7 g/10 min (200° C., ASTMD 1238). Elastomer-reinforced polymers are commonly referred to as impact modified or high impact polystyrene (HIPS). Typically, elastomer-reinforced styrene polymers having discrete elastomer particles and/or cross-linked elastomer dispersed throughout the styrene polymer matrix can be useful to improve the physical properties of the polymers. The HIPS contained polystyrene (PS) and particles which were believed to be elastomer particles and/or cross-linked elastomer having a wide distribution of in diameters from nanometer to microns. The particles made up approximately 35% wt of the HIPS.

The first polymer (nanofibers) used was homopolymer polypropylene (HPP) which was obtained in granule form from Lyondell Basell as Pro-fax PH350 and had a melt flow of 3.5 g/10 min (230° C., ASTMD 1238). The granule HPP was pelletized using a twin screw extruder Prism TSE 16TC. The HIPS and HPP pellets were premixed in a mixer at a weight ratio of 80/20. The mixture was fed into a co-rotating 16 mm twin-screw extruder, Prism TSE 16TC. The feed rate was 150 g min$^{-1}$ and the screw speed was 92 rpm. The blend was extruded through rod die where the extrudate was subject to an extensional force that sufficient enough to generate nanofibers in the matrix. The extrudate was cooled in a water bath at the die exit and collected after passing through a pelletizer.

The pellets (the first intermediate) contained parallel HPP nanofibers (approximately 80% of the fibers had a diameter less than 500 nm and had an aspect ratio of greater than 40:1).

The pellets (first intermediate) were randomly arranged into a layer to form the pre-consolidation formation. The pre-consolidation formation was compression molded for 15 minutes at a pressure of 30 tons and a temperature was 320° F. using a carver hydraulic forming the second intermediate, a solid nano-composite film with a thickness of 0.3 mm. It was determined that approximately 90% of the HPP fibers were bonded to other HPP nanofibers.

The second intermediate was immersed in toluene at room temperature for 30 minutes to remove PS from the blends as PS is soluble in toluene and PP is insoluble in toluene. This step was repeated for two more times to ensure complete removal of polystyrene. The etched film was then immersed in acetone and methanol for 30 minutes respectively, then air dried. The weight of the etched film was 20% the weight of the initial blend.

The morphology of the nanofiber non-woven (etched nano-composite) was observed using a scanning electron microscope (SEM). The SEM images (FIG. 3A, 10,000× and FIG. 3B, 40,000×) represent the top view of the etched films. The nanofibers are randomly connected and fused together and the particles are inter-dispersed in the system with at least 50% adjacent and adhered to the nanofibers.

Example 2

Example 2 began with the nanofiber non-woven of Example 1, then proceeded to functionalize the HIPS particles. The nanofiber non-woven was soaked in sulfuric acid to achieve sulfonation of the cross linked particles.

Example 3

The first polymer (nanofibers) used was homopolymer polypropylene (HPP) which was obtained in granule form from Lyondell Basell as Pro-fax PH350 and had a melt flow of 3.5 g/10 min (230° C., ASTMD 1238). The nano-particles used were ALPHASAN® available from Milliken & Company. ALPHASAN® is an antimicrobial additive that utilizes silver to deter bacteria, fungus, mold, and other microbes from products. The second polymer (matrix) used was polystyrene (PS) Crystal PS 535 available from Total Chemical.

The HPP was pre-loaded with 10% wt ALPHASAN® through melt blending using a twin screw extruder. The PS and HPP/Alpha San pellets were mixed at a weigh ratio of 80/20. The final composition of the blend was PS/HPP/Alpha San 80/18/2. The mixture was processed to a nanofiber non-woven using the method set forth in Example 1.

The morphology of the nanofiber non-woven (etched nano-composite) was observed using a scanning electron microscope (SEM). The SEM images FIG. 4A (face view), FIG. 4B (side view), and FIG. 4C (side view) show that nanofibers were randomly connected and fused together and the nano-particles are inter-dispersed in the system with at least 50% adjacent and adhered to the nanofibers. The bright cubic particles shown in the SEM images are ALPHASAN® crystals which in shape are cubes with ~500 nm edges. Alpha San particles are dispersed trough out the nanofiber matrix. For comparison, in a regular PP injection molded plaque with 10% ALPHASAN®, most of the Alpha San crystals are imbedded in the bulk which is not easily accessible, as shown in FIG. 4D (face view). Only a few Alpha San crystals were exposed on the surface. Example 3 showed higher silver release rate than ALPHASAN® incorporated a solid PP film due to the accessibility of the particle surface in the nanofiber non-woven.

Example 4

The matrix (second polymer) and nano-particles used in Example 4 were high impact polystyrene high impact Polymethyl Methacrylate (PMMA) Acrylic which was obtained in pellet form from EVonic Cro LLC as ACRYLITE PLUS® NTA-211 and had a melt flow of 3.8 g/10 min ISO1132. The PMMA-acrylic contained nano-particles which were believed to be cross-linked elastomer particles. The first polymer (nanofibers) used was homopolymer polypropylene (HPP) which was obtained in granule form from Lyondell Basell as Pro-fax HPP 6301 and had a melt flow of 12 g/10 min (230° C., ASTMD 1238). The weight ratio of PMMA-acrylic/PP in the blend was 75/25. The mixture was processed to a nanofiber non-woven using the method set forth in Example 1.

After etching, the nanofiber non-woven contained spherical nano-particles with a diameter of approximately 250 nm uniformly dispersed and adhered onto the nanofibers, see SEM image FIG. 5.

Example 5

The first polymer (nanofibers) used was homopolymer polypropylene (HPP) which was obtained in granule form from Lyondell Basell as Pro-fax PH350 and had a melt flow of 3.5 g/10 min (230° C., ASTMD 1238). The particles used were $TiO_2$ with a mean particle diameter of less than 10 microns. The second polymer (matrix) used was polystyrene (PS) crystal PS 535 available from Total Chemical.

The HPP was pre-loaded with 2% wt $TiO_2$ through melt blending using a twin screw extruder. The PS and HPP/$TiO_2$ pellets were mixed at a weigh ratio of 80/20. The final composition of the first intermediate is PS535/PH350/$TiO_2$ ALPHASAN® 80/19.8/0.2. The mixture was processed to a nanofiber non-woven using the method set forth in Example 1. The $TiO_2$ was retained in the nanofiber matrix after etching indicating that the particles were adhered to the nanofibers.

Example 6

The first polymer (nanofibers) used was homopolymer polypropylene (HPP) which was obtained in granule form from Lyondell Basell as Pro-fax PH350 and had a melt flow of 3.5 g/10 min (230° C., ASTMD 1238). The particles used were Phoslite B631 C, a flame retardant particle, available from Italmatch Chemicals. The Phoslite has an average diameter of approximately 10 microns. The second polymer (matrix) used was polystyrene (PS) crystal PS 535 available from Total Chemical.

The HPP was pre-loaded with 3.3% wt Phoslite through melt blending using a twin screw extruder. The PS and HPP/Phoslite pellets were mixed at a weigh ratio of 80/20. The final composition of the first intermediate is PS535/PH350/Phoslite 80/19.67/0.33. The mixture was processed to a nanofiber non-woven using the method set forth in Example 1. The Phoslite was retained in the nanofiber matrix after etching indicating that the particles were adhered to the nanofibers.

Example 7

The first polymer (nanofibers) was formed from homopolymer polypropylene (HPP) which was obtained in granule form from Lyondell Basell as Pro-fax HPP6301 and had a melt flow of 12 g/10 min (230° C., ASTM 1238). The second polymer (matrix) was formed from polystyrene (PS) crystal PS 500 available from Total Chemical, having a melt flow of 14 g/10 min (200° C., ASTM 1238).

The PS and HPP pellets were premixed in a mixer at a weight ratio of 80/20. The mixture was fed into a co-rotating 16 mm twin-screw extruder, Prism TSE 16TC. The feed rate was 150 g min$^{-1}$ and the screw speed was 92 rpm. The blend was extruded through rod die where the extrudate was subject to an extensional force that sufficient enough to generate nanofibers in the matrix. The extrudate was cooled in a water bath at the die exit and collected after passing through a pelletizer. The pellets (the first intermediate) contained parallel HPP nanofibers (approximately 80% of the fibers had a diameter less than 500 nm and had an aspect ratio of greater than 40:1).

The first intermediate pellets were cryoground into powder form. The powders were mixed with an inorganic clay, palygorskite at a weight ratio of 99/1. Palygorskite is also known as attapulgite, a magnesium aluminum phyllosilicate. The single particle of palygorskite is a ~4 um needle in length with a diameter of 50 nm. The mixture of the cry ground intermediate and the clay powder was soaked in Acetone at room temperature for 10 minutes so that the mixture would become sticky and was more easily manipulated into a sheet (forming the pre-consolidation formation). Some degree of some compressing and stretching was applied to the "putty" to form the sheet.

The sheet was taken out of the solvent and heated in an oven at 320° F. for 5 minutes resulting the second intermediate. The second intermediate was immersed in toluene at room temperature for 30 mins to remove PS from the blends. This step was repeated for two more times to ensure complete removal of polystyrene. The etched article was then immersed in Acetone and Methanol for 30 mins respectively. A nanofiber and clay nanofiber non-woven was formed this way. The clay particles were left in the nanofiber matrix after etching indicating that the nano-particles were adhered to the nanofibers.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A process for forming a nanofiber non-woven comprising, in order:
    a) mixing a plurality of particles, a first thermoplastic polymer and a second thermoplastic polymer, wherein the first polymer and second polymer are in a softened state, wherein the second polymer is at least partially soluble in a first solvent, and optionally cooling the mixture;
    b) subjecting the mixture of step a) to elongational forces and heat forming nanofibers comprising the first polymer;
    c) bringing the mixture of step b) to a condition where the temperature is below the softening temperature of the first polymer forming a first intermediate;
    d) consolidating the first intermediate with pressure and a temperature greater than the glass transition temperature of the second polymer forming a second intermediate, wherein at least 70% of the nanofibers are fused to other nanofibers, and
    e) removing at least a portion of the second polymer from the second intermediate forming the nanofiber non-woven, wherein after step e) at least 50% of the particles are positioned outside of the nanofibers, adjacent to a surface of the nanofibers.

2. The process of claim 1, wherein the particles are nanoparticles having at least one dimension less than one micron.

3. The process of claim 1, wherein the mixing of step a) is performed at a temperature greater than the glass transition temperature of the second polymer.

4. The process of claim 1, wherein the mixing of step a) is performed at a temperature where both the first and second polymers are in a molten state.

5. The process of claim 1, wherein the subjecting the mixture of step a) to elongational forces comprises extruding the particles, the first polymer, and the second polymer in the softened state.

6. The process of claim 1, wherein bringing the mixture of step b) to a condition where the temperature is below the softening temperature of the first polymer comprises cooling the mixture of step b) to a temperature is below the softening temperature of the first polymer.

7. The process of claim 1, wherein step a) further comprises mixing the particles, the first polymer, the second polymer, and a first solvent, and wherein bringing the mixture of step b) to a condition where the temperature is below the softening temperature of the first polymer comprises removing at least a portion of the first solvent.

8. The process of claim 1, wherein the consolidation temperature is above the $T_g$ and of both the first polymer and second polymer and within 50 degrees Celsius of the solidification temperature of first polymer.

9. The process of claim 1, wherein removing at least a portion of the second polymer comprises removing essentially all of the second polymer with the first solvent.

10. The process of claim 1, wherein the particles are approximately equally distributed throughout the nanofiber non-woven.

11. The process of claim 1, wherein the average diameter of the nanofibers is less than about 400 nanometers.

12. The process of claim 1, wherein after step e) at least 80% of the particles are positioned adjacent a surface of the nanofibers.

13. The process of claim 1, wherein at least 80% of the nanofibers are fused to at least one other nanofiber in the nanofiber non-woven.

14. The process of claim 1, wherein at least 95% of the nanofibers are fused to at least one other nanofiber in the nanofiber non-woven.

15. The process of claim 1, wherein the thermoplastic nanofibers comprise a thermoplastic selected from the group consisting of polyolefins, polycarbonates, polyesters, and polyamides.

16. The process of claim 1, wherein the particles comprise inorganic material.

17. The process of claim 1, wherein the particles comprise organic material.

18. The process of claim 1, wherein the particles comprise core/shell particles.

19. The process of claim 1, wherein the particles comprise are functionizable.

20. The process of claim 1, wherein the particles have antimicrobial properties.

* * * * *